June 7, 1927.

V. WILLOUGHBY 1,631,304

TANK CAR

Filed June 15, 1926

INVENTOR
Victor Willoughby
BY
ATTORNEY

June 7, 1927.
V. WILLOUGHBY
1,631,304
TANK CAR
Filed June 15, 1926      5 Sheets-Sheet 2
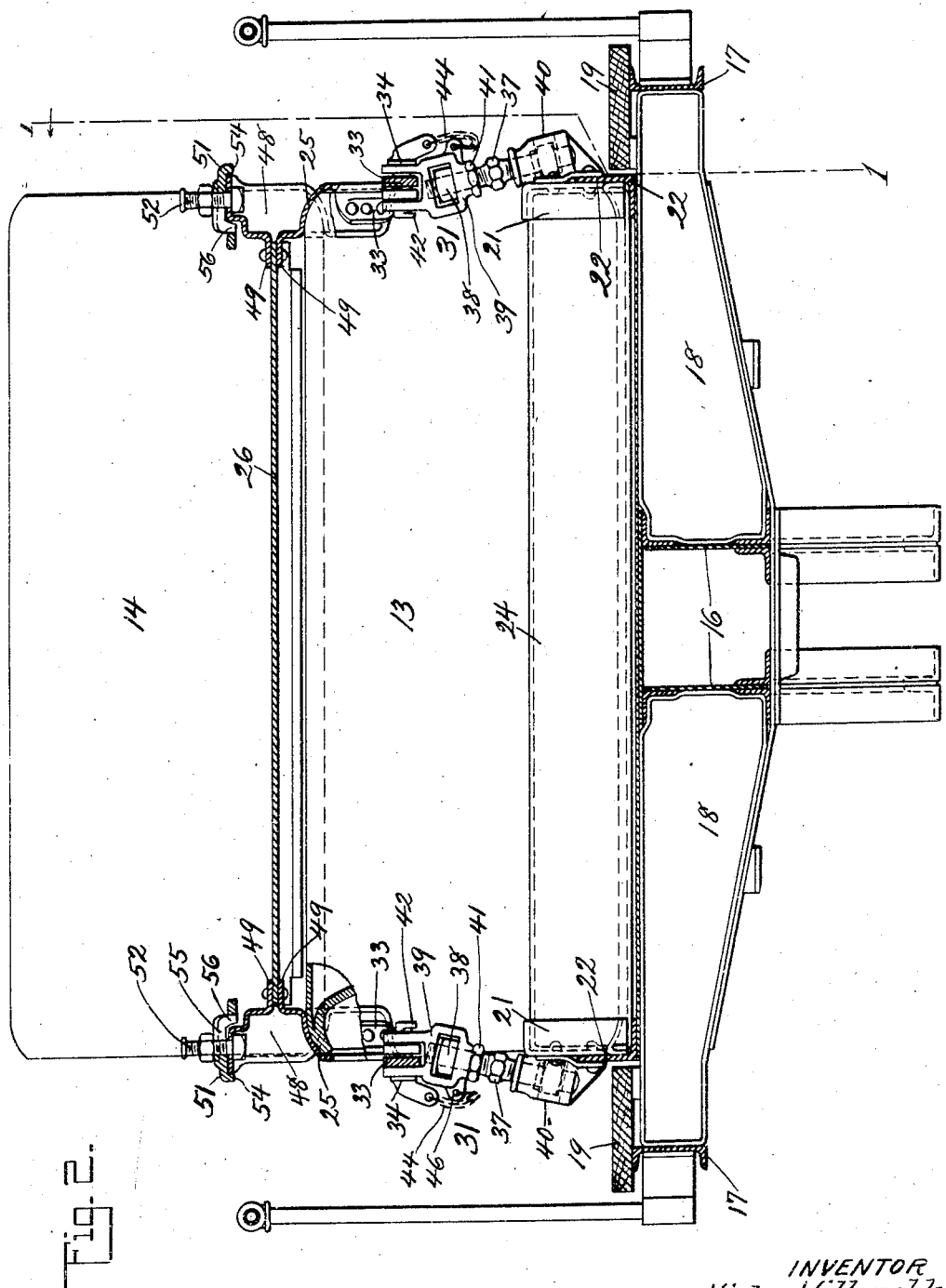
INVENTOR
Victor Willoughby
BY F. H. Gibbs
ATTORNEY

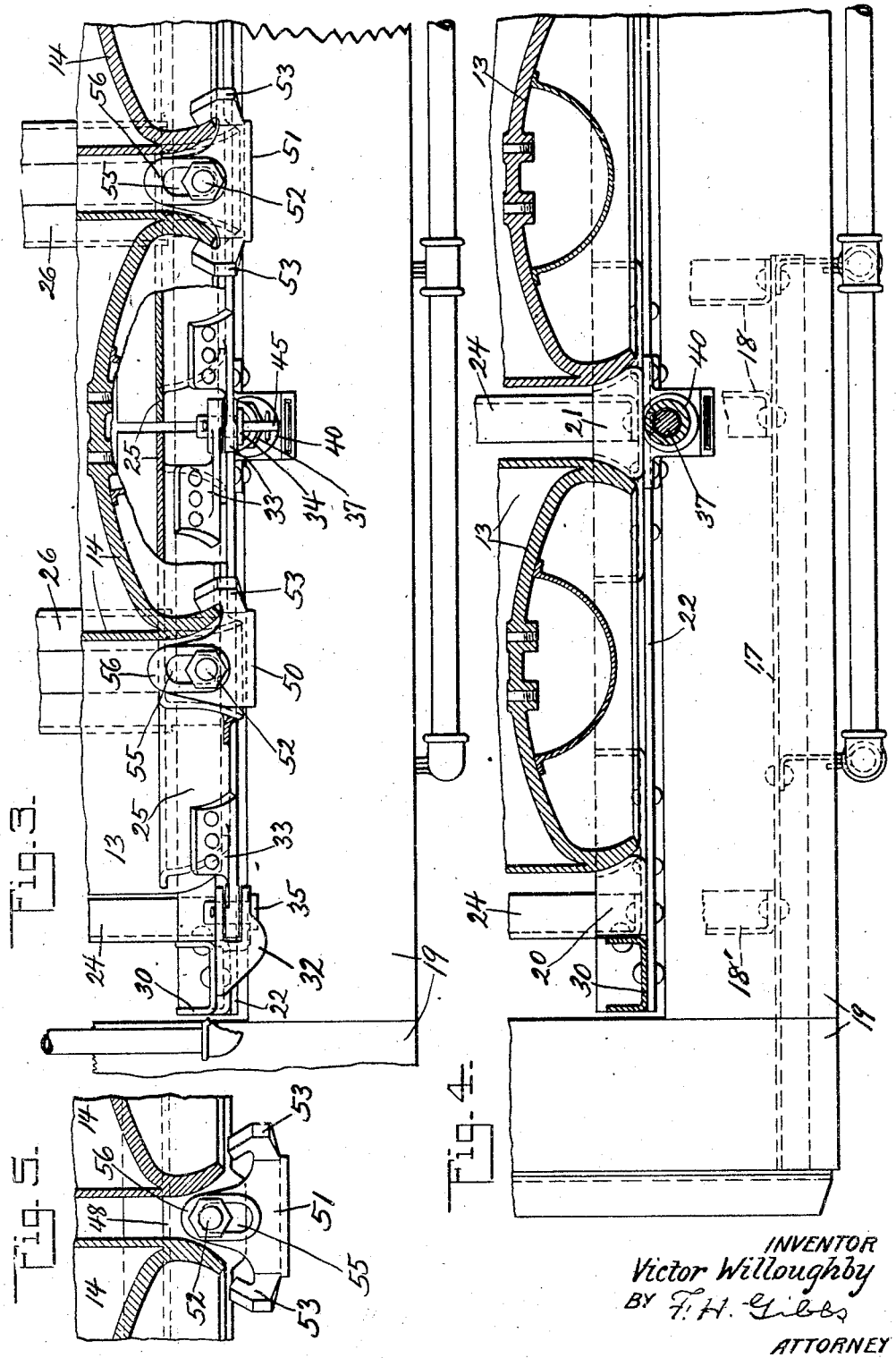

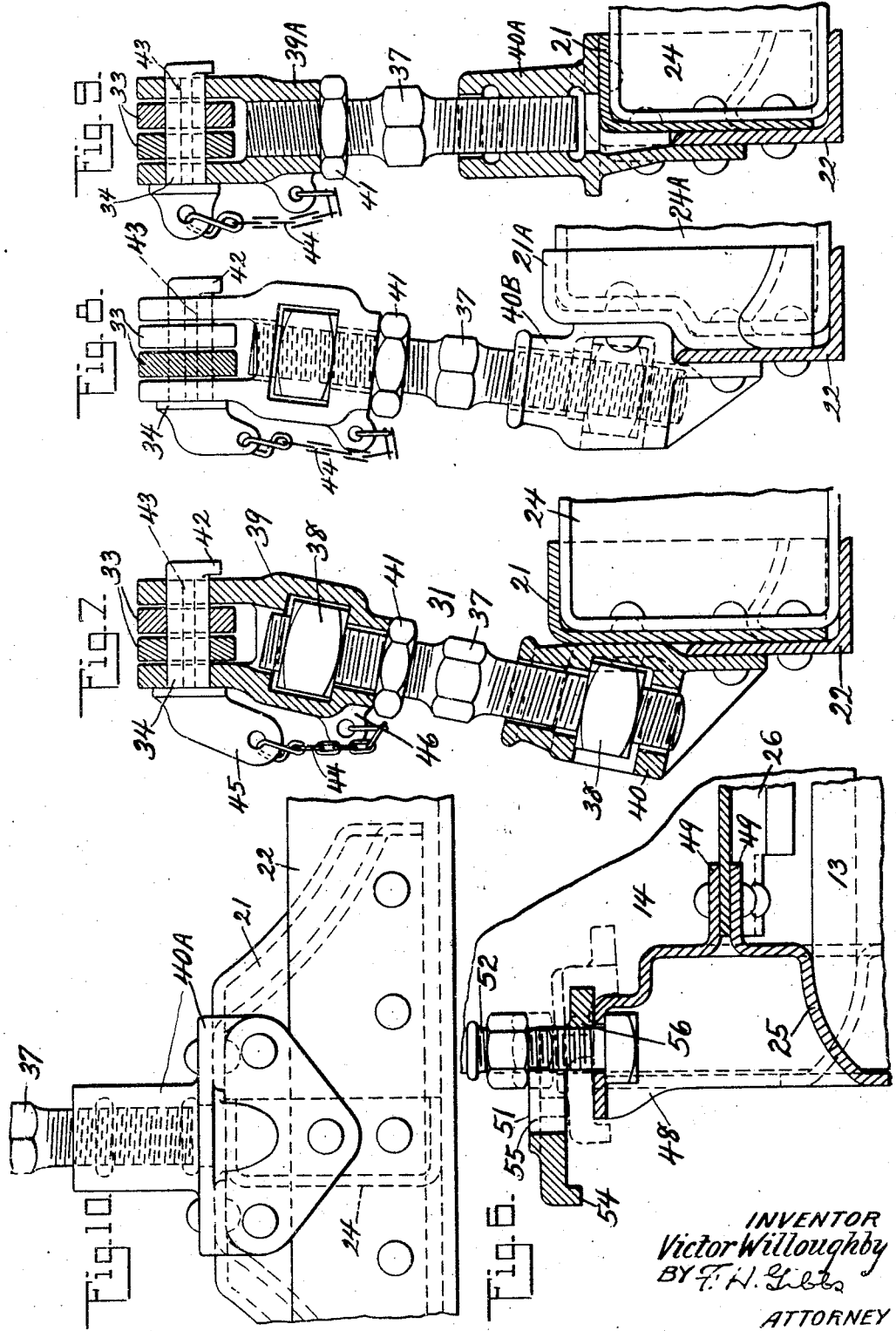

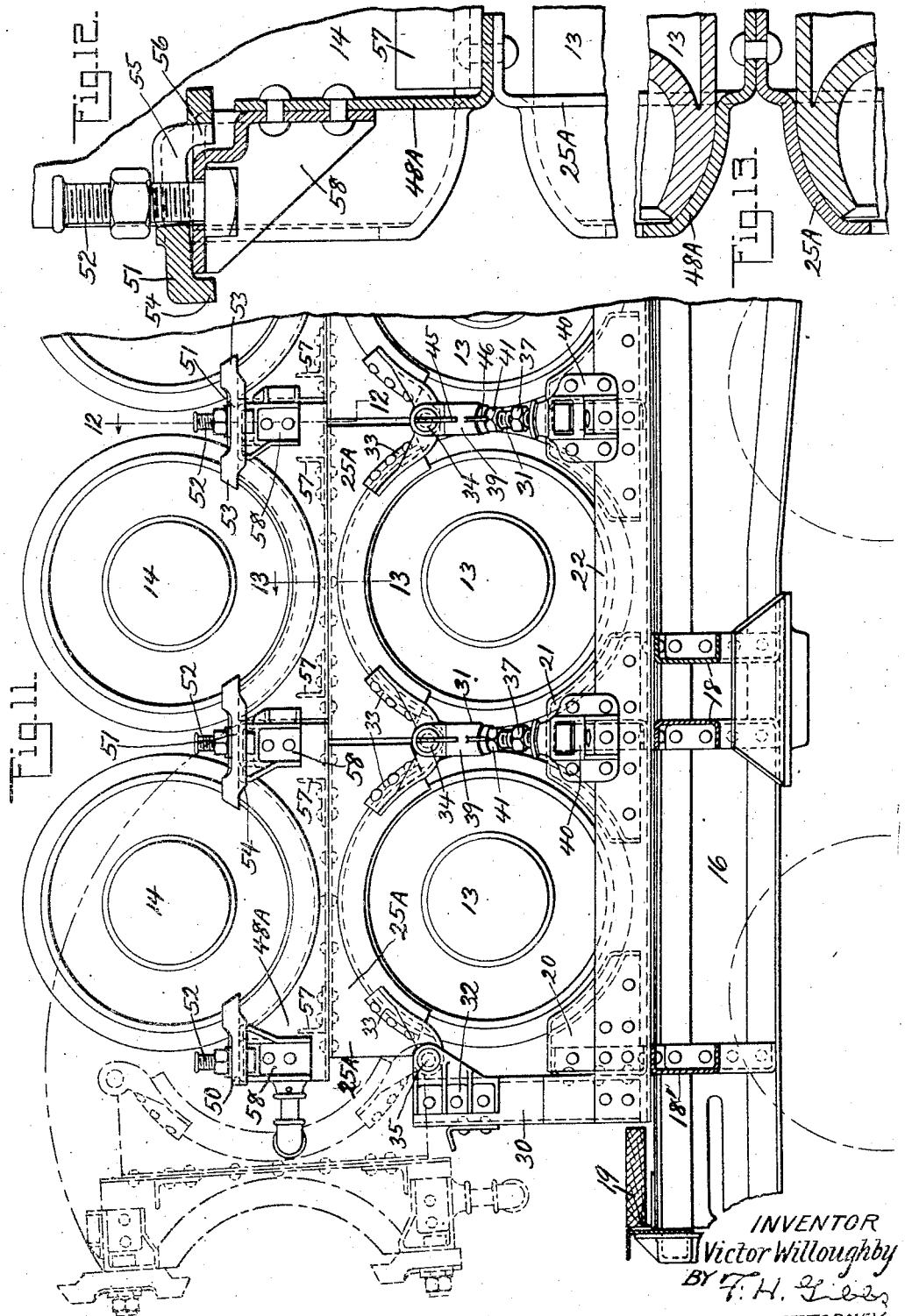

Patented June 7, 1927.

UNITED STATES PATENT OFFICE.

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

TANK CAR.

Application filed June 15, 1926. Serial No. 116,128.

In the drawings:

Fig. 2 is a sectional view at right angles to Fig. 1, taken as indicated by the line 2—2 in Fig. 1;

Fig. 3 is a fragmentary plan view with tanks of the upper tier broken away horizontally, as shown at the top of Fig. 1;

Fig. 4 is a fragmentary plan view with various parts in horizontal section, taken as indicated by the line 4—4 in Fig. 1;

Fig. 5 is a fragmentary plan and sectional view, similar to Fig. 3, showing the securing means for the upper tanks retracted into inactive position so as to release the tanks;

Fig. 6 is a fragmentary vertical section, similar to Fig. 2, but on a larger scale, showing the securing means for the upper tanks in the same position as in Fig. 5, the active position of the same being indicated in dotted lines;

Fig. 7 shows a vertical section through a portion of the securing means for the lower tanks, taken as indicated by the line 7—7 in Fig. 1, but on a larger scale;

Fig. 8 is a side view of a like securing means, from the right of Fig. 1, certain associated parts being broken away or in vertical section, and others slightly modified;

Fig. 9 is a view similar to Fig. 7, illustrating a different form of securing device;

Fig. 10 is a fragmentary side view of the lower portion of the device shown in Fig. 9, from the left of that figure;

Fig. 11 is a view similar to Fig. 1, illustrating a construction in which the upper tanks are arranged directly over the lower tanks, instead of staggered in reference to them as in Fig. 1;

Figure 1:
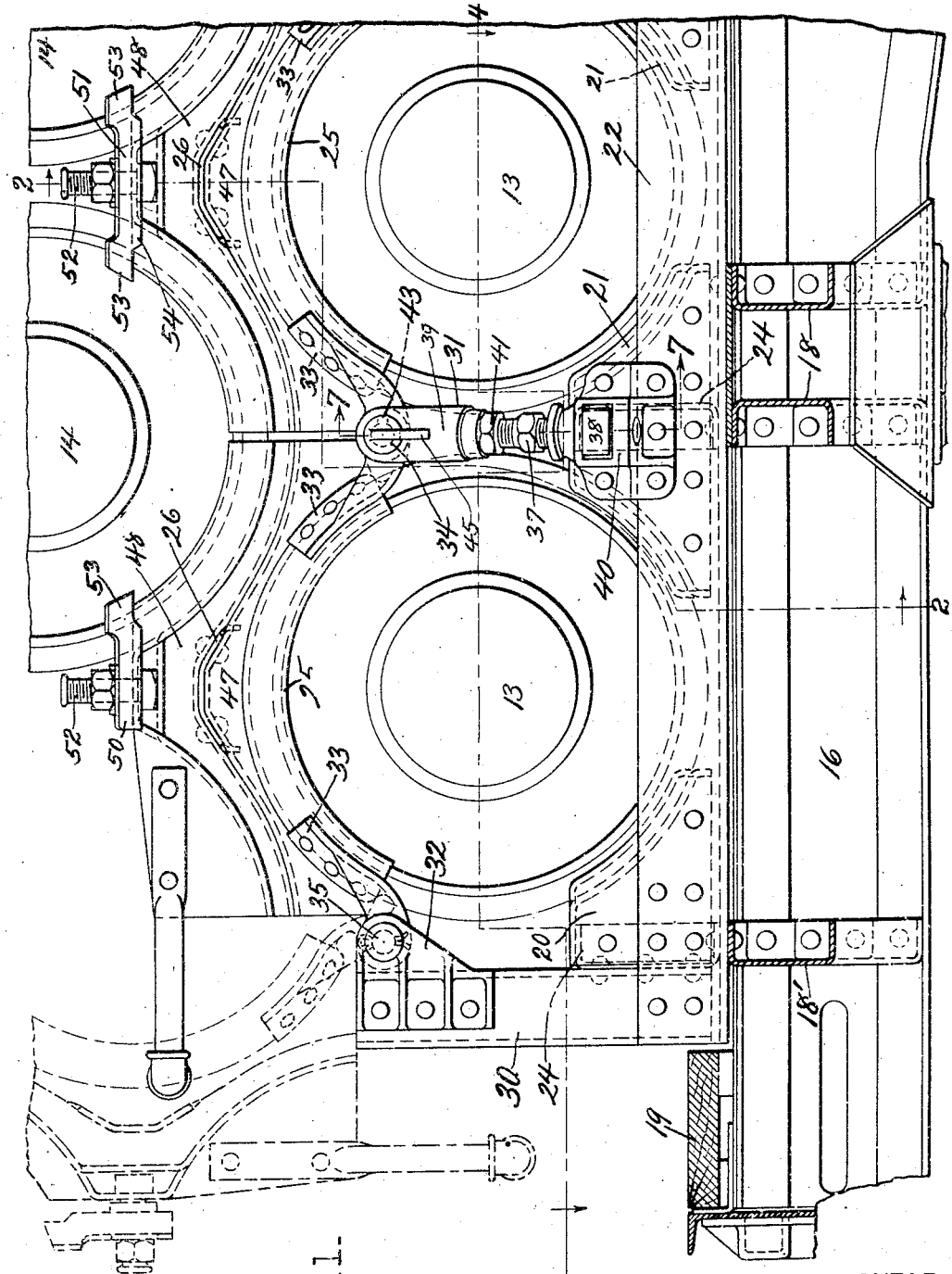
Fig. 1 is a fragmentary side view of a multiple tier, multiple unit tank car construction conveniently embodying my invention; various parts being broken away and in vertical section as indicated by the line 1—1 in Fig. 2.

Figs. 12 and 13 are fragmentary sectional views, taken as indicated by the lines 12—12 and 13—13 in Fig. 11, but on a larger scale.

As will be perceived from the drawings, my invention is concerned with the mounting and securing of tanks on cars, including multiple unit tank cars, and particularly cars whose tanks are arranged in a plurality of tiers. It is an object of the invention to hold the tanks securely in place under any and all conditions of railway service, yet to permit of their being removed from the car easily and expeditiously when desired. It is also an object of the invention to provide a simple and rugged construction for such purposes, including features and devices whose utility is not limited to multiple unit or multiple tier cars.

In Figs. 1 and 2, my invention is shown applied to a tank car comprising lower and upper tiers of transverse tanks 13 and 14 carried by an underframe of usual construction. This underframe comprises center sills 16 and side sills 17 inter-connected by bolsters 18 and transoms 18'. Running boards 19 are shown at the side and the ends of the car, supported upon the sills 16, 17 and the bolsters 18 and transoms 18'. On the underframe are saddle members 20 and 21 of pressed sheet metal, in the form of plates curved and flanged at their upper and outer edges to conform to the tanks 13 and seat them securely. As shown in Figs. 1, 2, and 4, these saddles are secured (by rivets through their webs) to the inner sides of angle bar members 22 of the car frame; which members 22 are secured by rivets to the tops of the bolsters 18. Pairs of opposite saddles are braced and stayed by cross-connecting members 24, of channel section. (Figs. 1–4.) Besides conforming to the tanks 13 circumferentially, the saddle flanges are bent inward and curved to conform to the incurved end flanges of the tanks.

As shown in Figs. 1, 2, and 3, the lower tanks 13 are held in place in the seats afforded by the saddles 20 and 21 by securing means engaging their upper sides, and also serving to support and secure the upper tanks 14. The securing means for this purpose comprises a series of fore and aft sections in the form of yoke members 25 of pressed sheet metal, suitably hollowed and curved to conform to the top sides of the round tanks 13, and also (like the saddles 20, and 21) curved to conform to the incurved tank end flanges. The yokes 25 for opposite ends of the tanks 13 are interconnected by channel-like cross-members 26 riveted to flanges 49 on said yokes 25, the parts thus forming a substantially rigid, unitary retaining frame.

The yoke members 25 are connected and secured to the car frame in the intervals between tanks 13, and also at either end of the entire lower tier. For this purpose, there are short rigid anchorage uprights 30 of channel section upstanding from the car frame members 22 at their ends, and adjustable stays 31 at intervals along said members 22. As shown in Fig. 1, the uprights 30 are securely braced to the longitudinal frame members 22 by riveted attachment of their flanges to flanges on the saddles 20, as well as by riveting to the upstanding flanges of the members 22 themselves, and are provided with pivot ears 32 at their upper ends. The yokes 25 likewise have pivot ears 33 at their ends. At each side of the car, the yokes 25 are connected together and to the stays 31 by pivot pins 34, and the flexible articulated structure or chain of the yokes 25 thus formed is secured at either end to the anchorage ears 32, by means of pivot pins 35. At intervals between tanks 13, this flexible securing chain is held down by the stays 31 attached to the yoke articulations, as already indicated.

As shown in Figs. 1, 2, 7 and 8, the adjustable stays 31 are of turn-buckle type, comprising a member 37 whose oppositely threaded ends work in nuts 38 which are somewhat loosely socketed in heads 39 that engage at either side of the yoke ears 33 and take the pivot pins 34, and in bosses 40 secured to the saddles 21 and the members 22. Lock nuts 41 may be provided for holding the heads 39 fast on the turn-buckle members 37. As shown in Figs. 1, 7 and 8, the pivot pins 34 have retaining lugs 42 on their ends which may be brought into registry with the notches 43 in the heads 39 and in the yoke ears 33 by turning the pins 90 degrees from their positions as shown. Preferably, the pivot pins 34 are secured against loss by chains 44 connected to lugs 45 on the pins and to lugs 46 on the heads 39.

In Fig. 8, the outer end or web of the saddle 21$^A$ is shown joggled inward, and the shape of the boss 40$^B$ is correspondingly modified. This allows the stays 31 to stand straighter and decreases their projection into the gangways along the running boards 19.

The stay construction illustrated in Figs. 9 and 10 differs from that described in the omission of the nuts 38: i. e. the opposite threaded ends of the member 37 take directly into the head 39$^A$ and the boss 40$^A$. As shown, this stay is vertical instead of inclined (as in Figs. 2, 7, and 8.) and is secured on the upper corner of the saddle 21.

To afford seats for the upper tanks 14, the upper sides of the yokes 25 have a conformation similar to that of their lower sides (but concave upward instead of downward) to either side of the yoke crests at 47. As shown in Figs. 1 and 2, these upper tank seats are formed in separate parts 48 whose lower edges have stiffening flanges 49 that fit and are secured to similar flanges 49 on the upper edges of the yoke portions that engage the top sides of the lower tanks 13. The ends of the cross-members 26 extend and are riveted between these flanges 49 (Figs. 1, 3 and 6). The upper tanks 14 are held in their seats in the yoke parts 48 by single and double securing devices 50 and 51, shown in Figs. 1, 3 and 6 as comprising hook-ended plates secured to the crests of the supplemental yoke parts 48 by bolts 52. As will be seen from Fig. 1, each tank 14 is engaged by hooks 53 of devices 50 and/or 51 to either side of the tank. As the devices 50 and 51 are alike except as regards the number of hooks 53, it will suffice to describe one of the devices 51. As shown in Figs. 1, 2, 3, 5, and 6, the plate forming the device 51 is flanged at 54 for strength and slotted at 55 to take the bolt 52 and permit the device to be retracted from the active position shown in Figs. 2 and 3, where the upbent hooks 53 engage inside the inturned end flanges of the tanks 14, to the inactive, disengaged position shown in Figs. 5 and 6, so as to release the tanks 14 at either side. As shown in Fig. 6, the inner end of the plate forming the device 51 is joggled downward at 56, to afford a shoulder for engaging inside the inner edge of the member 48 to lock the device 51 in active position.

The construction shown in Figs. 11 to 13 differs from that of Figs. 1 to 4 principally in that the tanks 14 of the upper tier are arranged substantially directly over the tanks 13 of the lower tier, instead of staggered as already mentioned. Accordingly, the seat for each upper tank 14 is formed altogether in the supplemental upper part 48$^A$ of the yoke 25$^A$ for each corresponding lower tank 13, and these yoke parts have their mating edges straight instead of irregular, as in Fig. 1. To afford a point of attachment for the securing devices 51 for the upper tanks, the breaks or divisions between the upper portions of the yokes 25 are slightly off center. The cross-connection between the yokes 25$^A$, 25$^A$ at opposite sides of the car consists of a pair of angle bars 57, 57 for each tank 13. As shown in Fig. 12, the securing devices 50 and 51 for the upper tanks are mounted on separate brackets 58 of suitable character, riveted to the outer sides of the upper yoke members 48$^A$.

In Figs. 9, 10, 11, 12, and 13, various parts and features are marked with the same reference characters as the corresponding ones in Figs. 1–8, as a means of dispensing with repetitive description.

In service, the release of the clamps 50 and 51 frees the upper tanks 14 for immediate removal. Thereupon the stays 31 may be slackened slightly, and alternate pivot pins 34 withdrawn so as to release one end of each yoke 25 or 25$^A$ and allow it to be swung out of the way, as indicated in dotted lines in Figs. 1 and 11. If preferred, of course, all of the pivot pins 34 may be withdrawn and all of the yokes 25 (except the end ones) lifted off completely.

What is claimed is:

1. A multiple unit tank car construction comprising a car frame with tank seats; opposed connected unitary retaining frames for engaging the top sides of each tank adjacent each end thereof; and means for securing said retaining frames to the car frame.

2. A multiple unit tank car construction comprising a car frame with horizontal tank seats; unitary retaining frames comprising opposed cross-connected tank-engaging yoke members; and means for securing said retaining frames to the car frame.

3. A multiple unit tank car construction comprising a car frame with tank seats; unitary retaining frames comprising yoke members formed to engage over the corners of tanks in said seats at either end of such tanks and cross-connections between the yoke crests; and means for securing the yoke members to the car frame between their tank-engaging portions.

4. A multiple unit tank car construction comprising a car frame with tank seats and unitary retaining frames, for engaging the top sides of tanks in said seats, pivoted to swing transversely of the tanks to release the tanks or to engage them.

5. A multiple unit tank car construction comprising a car frame, a series of tanks thereon, rigid anchorages upstanding from said frame at either end of the series, securing means extending along over the series between said anchorages, and stays connecting said securing means to the frame between tanks.

6. A multiple unit tank car construction comprising a car frame, a series of tanks thereon, securing means over the tanks, and stays for holding said securing means to the car frame comprising socketed heads pivoted to said securing means, socketed bosses on said structure, and turn-buckles with nuts engaged in the sockets of said heads and said bosses.

7. A multiple unit tank car construction comprising a car frame, superposed tiers of tanks carried thereby, and means for securing the tanks of a lower tier also supporting and securing those of the tier above.

8. A multiple unit tank car construction comprising a car frame; superposed tiers of tanks carried thereby; and a combined securing and supporting structure for the lower and upper tanks extending along between the tiers and comprising a series of inter-connected sections separable between adjacent lower tanks.

9. A multiple unit tank car construction comprising a car frame; superposed tiers of tanks carried thereby; and a combined securing and supporting structure for the lower and upper tanks extending along between the tiers and comprising a series of pivoted sections separably inter-connected between adjacent lower tanks.

10. A multiple unit tank car construction comprising a car frame; superposed tiers of tanks carried thereby; and a combined securing and supporting structure for the lower and upper tanks extending along between the tiers and comprising a series of sections pivoted and separably inter-connected between adjacent lower tanks.

11. A multiple unit tank car construction comprising a car frame, superposed tiers of tanks carried thereby, and securing yokes over the tanks of a lower tier affording concave seats for those of the tier above.

12. A multiple unit tank car construction comprising a car frame, superposed tiers of tanks carried thereby, and securing yokes over the tanks of a lower tier affording seats for those of the tier above, and securing means for adjacent upper tanks mounted on the yokes between the corresponding upper tank seats.

13. A multiple unit tank car construction comprising a structure affording seats for a double series of tanks ranged side by side, hook-ended clamps for engaging the end flanges of adjacent tanks, and bolts for holding said clamps to said supporting structure between the adjacent tank seats.

14. A tank car construction comprising a structure affording a tank seat, and securing means for the tank comprising a clamp bolt in said structure and a clamp on said bolt with a portion joggled downward to afford a shoulder for engaging said structure to hold the clamp in active position over the tank flange, and slotted around the bolt to allow the clamp to be retracted when the bolt is loosened.

15. In a multiple unit tank car having tank seats and tanks therein, means for securing the tanks in said seats comprising series of retaining frames engaging the ends of the tanks, and means connecting said retaining frames in pairs whereby each pair supports a tank.

16. In a multiple unit tank car having tank seats and tanks therein, means for securing the tanks in said seats comprising series of connected retaining frames arranged in pairs, each pair engaging the ends of a tank, and means for securing each series of retaining frames to a car frame.

17. In a multiple unit tank car having tank seats and tanks therein, means for securing the tanks in their seats comprising opposed series of connected tank engaging frames arranged longitudinally of the car frame and engaging the ends of the tanks, means connecting opposed frames, and means for securing each series of tank engaging frames to a car frame and to the tanks.

18. In a multiple unit tank car having tank seats and tanks therein, means for securing the tanks in their seats comprising opposed series of retaining frames, the frames of each series engaging one end of the tanks, means connecting opposed frames and means for securing the series of frames to a car frame and to the tanks.

19. In a multiple unit tank car having tank seats and tanks therein, means for securing the tanks in their seats comprising opposed series of retaining frames, each formed of a plurality of tank engaging units with the units of the opposed series arranged in pairs, cross-connecting means for opposed pairs of units, and means for securing each series of frames to a car frame.

20. In a multiple unit tank car having tank seats and tanks therein, means for securing the tanks in their seats and for supporting superposed tanks comprising opposed series of retaining frames, each formed of a plurality of oppositely arranged tank engaging units adapted to secure a bottom row of tanks and to support a superposed row of tanks, means on said units to secure the superposed row of tanks to their seats, cross-connecting means for opposed units and means secured to a car frame and engaging said units for retaining the bottom row of tanks in their seats.

21. In a multiple unit tank car having tank supports and tanks therein, means for securing the tanks in their seats and for supporting superposed tanks comprising opposed series of retaining frames, each formed of oppositely arranged tank engaging units, said units being so formed as to engage the upper side of the lower tanks and to receive and support a portion of a superposed tank, means connecting the opposed units of the series in pairs and means connecting the units to a car frame for retaining the lower tanks in their seats.

In witness whereof I have hereunto set my hand.

VICTOR WILLOUGHBY.